United States Patent
Khorrami et al.

(10) Patent No.: US 11,485,471 B2
(45) Date of Patent: Nov. 1, 2022

(54) APPLICATION OF LEADING EDGE SERRATION AND TRAILING EDGE FOAM FOR UNDERCARRIAGE WHEEL CAVITY NOISE REDUCTION

(71) Applicant: UNITED STATES OF AMERICAL AS REPRESENTED BY THE ADMINISTRATOR OF NASA, Washington, DC (US)

(72) Inventors: Mehdi R. Khorrami, Norfolk, VA (US); Patricio A. Ravetta, Blacksburg, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 1013 days.

(21) Appl. No.: 16/101,006

(22) Filed: Aug. 10, 2018

(65) Prior Publication Data
US 2019/0061903 A1 Feb. 28, 2019

Related U.S. Application Data

(60) Provisional application No. 62/550,184, filed on Aug. 25, 2017.

(51) Int. Cl.
*B64C 1/40* (2006.01)
*G10K 11/162* (2006.01)
(Continued)

(52) U.S. Cl.
CPC .............. *B64C 1/40* (2013.01); *G10K 11/161* (2013.01); *G10K 11/162* (2013.01); *B64C 2025/003* (2013.01)

(58) Field of Classification Search
CPC ..... B64C 1/40; B64C 2025/003; B64C 27/22; B64C 25/001; B64C 25/32; G10K 11/161; G10K 11/162
See application file for complete search history.

(56) References Cited

U.S. PATENT DOCUMENTS 6,454,219 B1    9/2002  Moe
6,536,711 B1 *  3/2003  Conway, Jr. .............. B64C 3/48
                                                    244/129.5
(Continued)

FOREIGN PATENT DOCUMENTS

WO   WO-2015198093 A1 * 12/2015 ............. B64C 21/10
WO   WO-2019163379 A1 *  8/2019 ............. B64C 25/34

OTHER PUBLICATIONS

Rowley. C.W., and Williams, D.R., "Dynamics and control of high-Reynolds-number flow over open cavities," Annu. Rev. Fluid Mech., vol. 38 pp. 251-276, 2006.
(Continued)

*Primary Examiner* — Assres H Woldemaryam
*Assistant Examiner* — Aaron M Rodziwicz
(74) *Attorney, Agent, or Firm* — Robin W. Edwards; Helen M. Galus

(57) ABSTRACT

A system for use in an aircraft or other system in an ambient airflow includes a body defining a cavity having an opening exposed to ambient airflow, with a cavity interface defined by body structure surrounding the opening. The cavity interface includes a cavity floor opposite the cavity opening, a leading edge facing away from the ambient airflow, a trailing edge facing the airflow, and a rear wall extending between the trailing edge and the cavity floor. A panel of sound-absorbing material is attached to and covers substantially all of the surface area of the rear wall of the cavity, and minimizes emanation of a predetermined range of audible sound frequencies from the cavity. The system may include (Continued)

an elongated serrated element connected to body and extending along the leading edge and arranged flush with the leading edge.

20 Claims, 2 Drawing Sheets

(51) Int. Cl.
*G10K 11/16* (2006.01)
*B64C 25/00* (2006.01)

(56) References Cited

U.S. PATENT DOCUMENTS

| | | | |
|---|---|---|---|
| 8,695,915 B1 | 4/2014 | Jones et al. | |
| 8,708,272 B1* | 4/2014 | Jones | B64C 23/005 |
| | | | 244/1 N |
| 8,763,958 B2 | 7/2014 | Turner et al. | |
| 9,132,909 B1 | 9/2015 | Khorrami et al. | |
| 9,227,719 B2 | 1/2016 | Khorrami | |
| 9,242,720 B2 | 1/2016 | Turner et al. | |
| 9,290,263 B2* | 3/2016 | Cook | B64C 25/16 |
| 9,334,059 B1 | 5/2016 | Jones et al. | |
| 9,623,952 B1 | 4/2017 | Jones et al. | |
| 9,650,127 B2 | 5/2017 | Khorrami | |
| 2004/0104301 A1* | 6/2004 | Wickerhoff | B64C 25/001 |
| | | | 244/10 |
| 2009/0078821 A1 | 3/2009 | Chow et al. | |
| 2015/0225069 A1* | 8/2015 | Lacy | B64C 1/40 |
| | | | 244/1 N |
| 2015/0352758 A1* | 12/2015 | Kim | G10K 11/16 |
| | | | 181/284 |
| 2016/0052621 A1* | 2/2016 | Ireland | F04D 29/684 |
| | | | 137/13 |
| 2016/0137284 A1 | 5/2016 | Turner et al. | |
| 2016/0215728 A1* | 7/2016 | Kernemp | F02K 1/60 |
| 2016/0298599 A1* | 10/2016 | Tian | B64C 23/06 |
| 2017/0137116 A1* | 5/2017 | Ireland | F04D 29/324 |
| 2017/0241278 A1* | 8/2017 | Paruchuri | F04D 29/324 |
| 2017/0247102 A1* | 8/2017 | Khorrami | B64C 1/403 |
| 2017/0298740 A1* | 10/2017 | Vathylakis | F01D 5/28 |
| 2019/0128214 A1* | 5/2019 | Vassberg | F04D 29/522 |
| 2019/0376529 A1* | 12/2019 | Joseph | F04D 29/665 |
| 2021/0180562 A1* | 6/2021 | Hertel Nilsson Van Kalken | ........ |
| | | | F03D 1/0633 |

OTHER PUBLICATIONS

Cattafesta III, et al., "Active Control of Flow-Inducted Cavity Oscillations," Progress in Aerospace Sciences, vol. 44. pp. 479-502, 2903.

Cattafesta III, et al., "Review of Active Control of Flow-Induced Cavity Resonance," AIAA Paper 2003-3567, 33rd AIAA Fluid Dynamics Conference and Exhibit, Jun. 23-26, 2003, Orlando, FL.

Takahashi et al., "Progress on Active Control of Open Cavities," AIAA Paper 2011-1221, 2011.

Heller, H.H., and Bliss, D.B., "The Physical Mechanism of Flow-Induced Pressure Fluctuations in Cavities and Concepts for Their Suppression," AIAA Paper 75-491, AIAA 2nd Aero-Acoustics Conference, Hampton, VA, Mar. 24-26, 1975.

Sarohia, V., and Massier, P.F., "Control of Cavity Noise," Journal of Aircraft, vol. 14, No. 9, pp. 333-837, Sep. 1977.

Lockard, David P., Airframe Noise Research Overview, Acoustic Technical Working Group, Slide 22, Apr. 19, 2016.

* cited by examiner

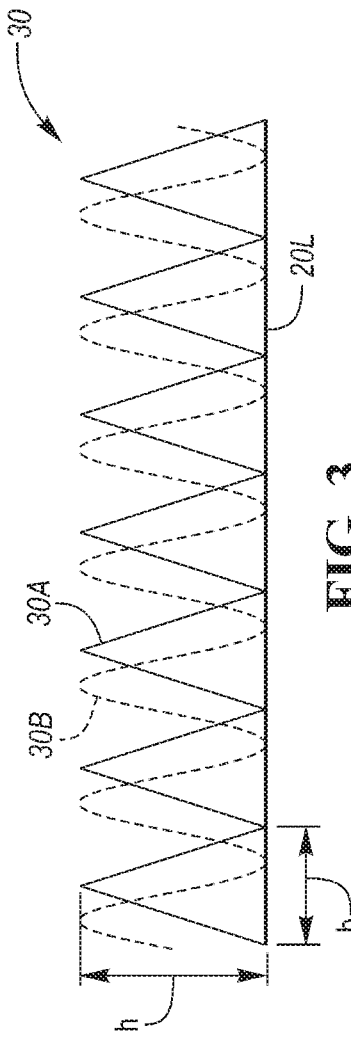
FIG. 3
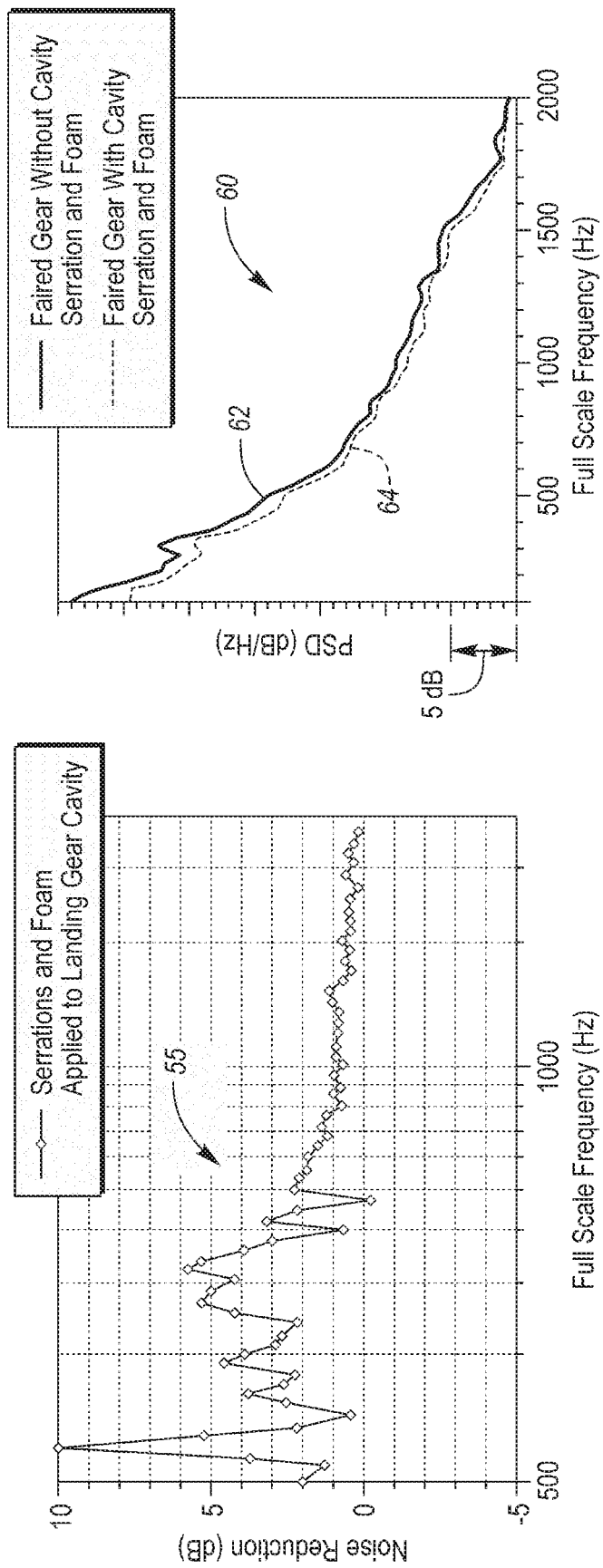
FIG. 4
FIG. 5

APPLICATION OF LEADING EDGE SERRATION AND TRAILING EDGE FOAM FOR UNDERCARRIAGE WHEEL CAVITY NOISE REDUCTION

CROSS-REFERENCE TO RELATED PATENT APPLICATION(S)

This application claims the benefit of priority to U.S. Provisional Application Ser. No. 62/550,184, which was filed on Aug. 25, 2017, the contents of which are hereby incorporated by reference in their entirety.

STATEMENT REGARDING FEDERALLY SPONSORED RESEARCH OR DEVELOPMENT

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND

Aircraft noise has important economic and public health implications. This is especially true for communities located near busy airports. As a result, commercial air carriers around the world are faced with increasingly stringent noise constraints. Noise research and development efforts conducted over the last several decades have succeeded in reducing noise levels associated with aircraft propulsion systems. Consequently, airframe noise—the particular component of aircraft noise produced by unsteady airflow around the fuselage, wings, and surrounding aircraft structure—is now on par with propulsion system noise as the leading contributor to overall levels of aircraft noise during approach and landing stages of flight. Improved airframe noise mitigation technologies are therefore essential for a continued reduction in overall aircraft noise.

Airframe noise is generated in and around interfacing surfaces defining a cavity that remains at least partially open and exposed to ambient airflow. For instance, an undercarriage landing gear cavity of an aircraft houses a retracted landing gear arrangement during cruise. A portion of such a cavity remains open during approach and landing. The cavity tends to amplify hydrodynamic pressure fluctuations, which in turn can produce cavity modes in the form of increased resonance at low-to-middle audible frequencies. Cavity noise is, therefore, an important contributor to airframe noise.

Cavity noise results from the formation and development of large-scale flow structures within a free shear layer emanating from the cavity's leading edge. Convection of the generated flow structures and subsequent interaction with the cavity's sharp trailing edge can create high-amplitude acoustic waves within the cavity. As noted above, the cavity may amplify pressure fluctuations, including fluctuations created by air flowing around bluff bodies located within the cavity, e.g., side braces, posts, and actuators of a landing gear arrangement. Remaining unresolved is the problem of effectively mitigating such cavity noise without sealing or covering the cavity opening, and without substantially increasing weight or complexity.

SUMMARY

A system for mitigating or reducing the above-noted cavity-related noise is disclosed herein. The noise may emanate, for instance, from an exposed undercarriage cavity of an example aircraft, for instance equipment, subsystem, or landing gear cavities, without limiting beneficial applications of the disclosure to aircraft in general or to undercarriage cavities in particular. Noise reduction solutions developed with open aircraft bays and sunroofs in mind tend to rely on passive and/or active flow control strategies, micro-perforations at the cavity lip, leading-edge deflectors or spoilers arranged perpendicular to and thus diverting the airflow, and/or active flow control strategies such as blowing, suction, and/or micro-actuators. However, these approaches may be less effective when applied to an exposed cavity of the type contemplated herein, within which resides a landing gear arrangement or other bluff body whose presence in the admitted cavity airflow substantially alters the nature of the flow field.

The present approach is therefore intended to improve upon the state of the art with respect to cavity noise reduction without contributing significantly to weight or operating complexity. The structures and methods described herein in the context of a non-limiting aircraft landing gear cavity application may be extended equally to mobile or stationary bodies defining a cavity that is open to ambient airflow. While the body defining the cavity is typically envisioned as moving through the air, such as an aircraft, spacecraft, marine vessel, or ground vehicle, the disclosure may be used to advantage in other applications in which the body itself remains stationary and airflow passes over the body, such as across open windows or service hatches of a building, particularly those in which the plane of the opening is parallel to the general direction of incident airflow.

In particular, the disclosed solution applies a panel of sound-absorbing material to a rear wall of the exposed cavity, with the cavity defined by a body, e.g., an aircraft fuselage. A perimeter of an opening of the cavity ("cavity opening") is defined by a leading edge, a trailing edge, and side edges of the body. In addition to a rear wall of the cavity, the cavity also includes a cavity floor positioned opposite the cavity opening, with the rear wall extending from the trailing edge all the way to the cavity floor. The sound-absorbing panel is specially constructed to minimize low-to-middle frequencies of sound, which in a possible embodiment includes the range of about 40 hertz (Hz) to 2 kHz.

As part of the present approach, an elongated serrated element may be optionally positioned along/co-extensive with the leading edge. The serrated element is configured to destabilize a shear layer of air passing over the exposed cavity, such that the shear layer is divided into incoherent flow structures that are more effectively absorbable by the panel of sound-absorbing material covering the rear wall of the cavity.

Included in the disclosure is an aircraft having first and second wings connected to a fuselage and extending radially outward from a centerline of the fuselage. The fuselage, first wing, and/or second wing define(s) an undercarriage cavity, e.g., a nose gear cavity and/or main landing gear cavity, having a cavity opening that is exposed to ambient airflow when the aircraft is in motion. A cavity interface immediately surrounds the cavity opening and is defined by structure of the fuselage, first wing, and/or second wing. The cavity interface includes a cavity floor opposite the cavity opening, a leading edge facing away from the ambient airflow, a trailing edge facing the airflow, and a rear wall extending between the trailing edge and the cavity floor. A panel of sound-absorbing material is attached to the rear wall. The panel, which covers substantially all of the surface area of the rear wall, also minimizes emanation of a predetermined range of audible sound frequencies from the undercarriage cavity.

The above features and advantages and other features and advantages of the present disclosure will be apparent from the following detailed description of the best modes for carrying out the disclosure when taken in connection with the accompanying drawings.

BRIEF DESCRIPTION OF THE SEVERAL VIEWS OF THE DRAWINGS

FIG. 3 is an idealized schematic illustration of example patterns usable for leading edge serrations of the system shown in FIG. 2.

FIG. 4 is a plot of exemplary noise reduction levels using the system of FIG. 2, with frequency in hertz (Hz) depicted on the horizontal axis and sound reduction in decibels (dB) depicted on the vertical axis.

FIG. 5 is a comparative power spectral density (PSD) plot for an 18% scale model aircraft having a faired landing gear equipped with the noise reduction system disclosed herein, and also lacking such a system, with frequency (Hz) depicted on the horizontal axis and sound dampening in dB/Hz depicted on the vertical axis.

Figure 1:
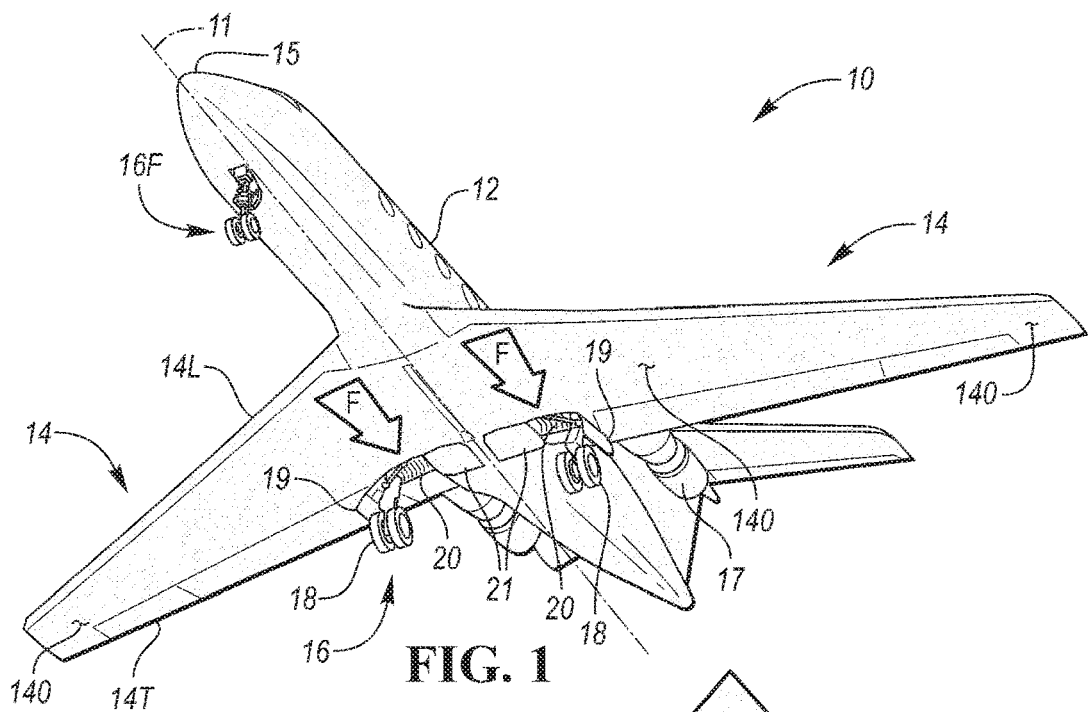
FIG. 1 is a schematic perspective view illustration of an example aircraft with undercarriage cavities exposed to ambient airflow, with the exposed cavities equipped with a noise reduction system of the type described in detail herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Embodiments of the present disclosure are described herein. The various embodiments are examples of the present disclosure, with other embodiments in alternative forms being conceivable by one of ordinary skill in the art in view of the disclosure. The figures are not necessarily to scale. Some features may be exaggerated or minimized to show details of particular components. Therefore, specific structural and functional details disclosed herein are not to be interpreted as limiting, but rather as a representative basis for teaching one skilled in the art to variously employ the present disclosure.

As those of ordinary skill in the art will also understand, features illustrated and described with reference to a given one of the figures may be combinable with features illustrated in one or more other figures in order to produce embodiments that are not explicitly illustrated or described. The combinations of features illustrated thus serve as representative embodiments for typical applications. Various combinations and modifications of the features consistent with the teachings of this disclosure, however, could be desired for particular applications or implementations.

For purposes of description herein, the terms "upper," "lower," "right," "left," "rear," "front," "vertical," "horizontal," "side", and derivatives thereof shall relate to a forward-facing orientation in FIG. 1. However, it is to be understood that various alternative orientations and sequences are possible, except where expressly specified to the contrary. It is also to be understood that the specific devices and processes illustrated in the attached drawings, and described in the following specification, are simply exemplary embodiments of the inventive concepts defined in the appended claims. Hence, scale or specific dimensions and other physical characteristics relating to the embodiments disclosed herein are not to be considered as limiting, unless the claims expressly state otherwise.

Figure 2:
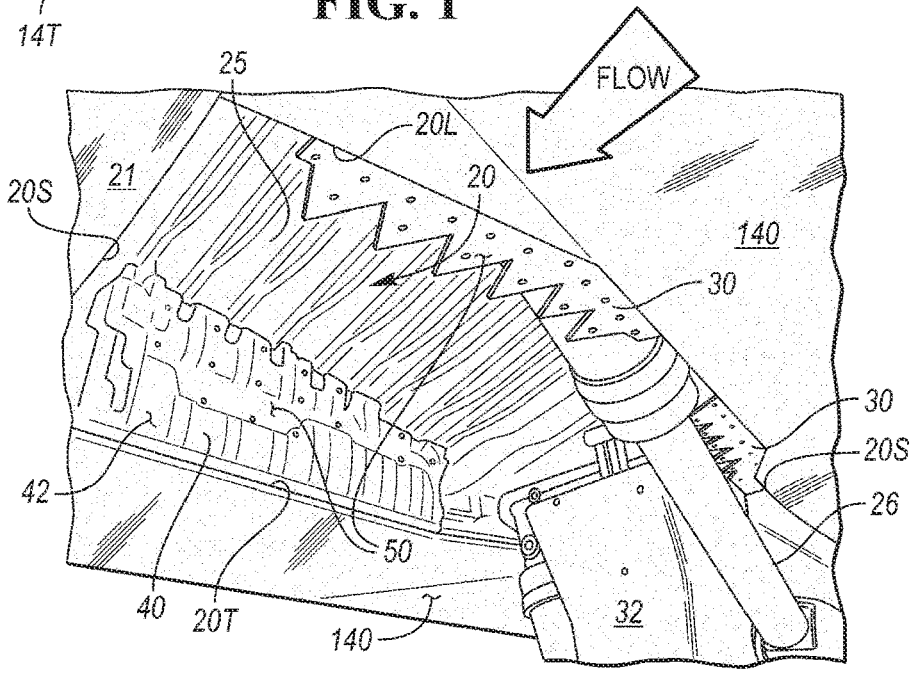
FIG. 2 is a schematic perspective view illustration of an example embodiment of a noise reduction system having a panel of sound-absorbing material and optional serrations on or near the respective trailing and leading edges of the cavity, with the system usable as part of the example aircraft shown in FIG. 1 and other systems having an exposed cavity.

A noise reduction system, shown at 50 in FIG. 2 and described below with reference to FIGS. 2-5, is usable with a body 12, e.g., of an example aircraft 10 of the type schematically depicted in FIG. 1. The body 12 may be constructed of a solid and relatively rigid material such as metal, fiberglass, or composite material depending on the application. In FIG. 1, the body 12 forms an aircraft fuselage having a centerline 11, and having wings 14 extending radially outward from the centerline 11. An underside 140 of the wings 14 is visible from the perspective of FIG. 1. For illustrative clarity, the body 12 will be referred to hereinafter as the fuselage 12 without limiting the disclosure to such an embodiment. Other bodies contemplated herein may include undercarriages or roofs of vehicles or mobile systems other than aircraft, as well as roofs or walls of buildings or other stationary structures where the present teachings may be beneficially applied.

In the illustrated embodiment of FIG. 1, the aircraft 10 is propelled via a propulsion system 17, e.g., turbofans, rotors, or propellers. With respect to a forward flight direction of the aircraft 10, the wings 14 have respective leading and trailing edges 14L and 14T, such that a primary direction of ambient airflow is from the leading edge 14L toward the trailing edge 14L as indicated by arrows F in FIG. 1.

The aircraft 10 is shown as it would appear from below to an observer during takeoff, approach, and landing stages of flight. At such times, a landing gear arrangement 16 having wheels 18 may be deployed from an undercarriage cavity 20. The cavity 20 may open to the underside 140 of the wings 14 and/or to an adjacent portion of the fuselage 12. A similar front landing gear 16F is likewise deployed below a nose 15 of the aircraft 10. The landing gear arrangements 16 and 16F are deployed and fully extended during takeoff and landing of the aircraft 10, as well as when taxiing of the aircraft 10 when the aircraft 10 is on the ground. The landing gear arrangement 16F disposed beneath the nose 15 is typically rotatable or otherwise equipped to enable steering of the aircraft 10 when taxiing. Although not shown in detail in FIG. 1, a landing gear arrangement such as the example landing gear arrangements 16 and 16F may include, in addition the wheels 18, one or more bluff body structural elements such as a main strut, shock struts, support arms, actuators, braces, etc., to safely deploy and retract the landing gear arrangements 16 and 16R, and to support and distribute the weight of the aircraft 10.

The exposed cavity 20 in the non-limiting exemplary embodiment of FIG. 1 may be an undercarriage landing gear cavity as shown. Other undercarriage cavities may be envisioned within the scope of the disclosure, such as but not limited to service or equipment bays, subsystem deployment bays, and the like. Likewise, and in particular for bodies other than the fuselage 12, the function and structure of the cavity 20 may vary, with other possible embodiments including sunroofs, windows, and ventilation hatches of vehicles, buildings, bridges, ornamental structures. For illustrative consistency, the aircraft 10 of FIG. 1 will be described hereinafter without limiting the scope of the disclosure to aircraft applications or landing gear cavities.

Retraction of the landing gear arrangements 16 or 16F into a respective cavity 20 may occur when the aircraft 10 is actively climbing or cruising at altitude. Retraction operation requires cavity doors 19 and 21 located on either side of the centerline 11 to open. The cavity doors 19 and 21 are then closed once the landing gear arrangements 16 or 16F are successfully retracted into the cavity 20. Thereafter, the cavity 20 is fully covered by the cavity doors 19 and 21 for improved aerodynamic performance of the aircraft 10 in flight. During approach and landing operations, however, the cavity doors 19 open to the position shown in FIG. 1 while the adjacent cavity doors 21 remain closed. The perimeter and internal volume of the now-exposed cavity 20 remains wetted by airflow passing over and through a cavity opening defined by the fuselage 12 and/or the wings 14. Consequently, undesirable low-to-middle frequency audible airframe noise may be produced by unsteady airflow around and into the cavity 20, with such noise emanating from the cavity 20. To address the airframe noise problem, the aircraft 10 may be equipped with the noise reduction system 50 that will now be described in detail with reference to FIGS. 2-5.

FIG. 2 is a close-up illustration of the cavity 20 of FIG. 1 when exposed to ambient airflow and equipped with the noise reduction system 50. Visible from the perspective of FIG. 2 is a portion of the underside 140 of the wing 14 located on the right side of the centerline 11 as viewed from the perspective of FIG. 1. Thus, the cavity door 21 is fully closed and the cavity door 19 (not visible in FIG. 2) is fully open, such that example bluff bodies in the form of a hydraulic piston or other power actuator 26 and a main strut fairing 32 extend from the cavity 20 to expose a cavity floor 25.

The noise reduction system 50 is coupled to the aircraft 10 of FIG. 1 for the purpose of reducing airframe noise associated with ambient air flowing into and around the volume of the exposed cavity 20, and thus emanating from the cavity 20. The opening into the cavity 20 is defined by the structure forming a perimeter of such an opening, i.e., a leading edge 20L, a trailing edge 20T, and side edges 20S extending between the leading and trailing edges 20L and 20T, respectively, with the edges 20L, 20T, and 20S, the cavity floor 25, and a rear wall 37 (FIG. 2A) collectively referred to herein as the "cavity interface".

The noise reduction system 50 includes a panel 40 of sound-absorbing material arranged proximate the trailing edge 20T, with an exposed surface 42 of the panel 40 extending in a transverse direction from the underside 140 as shown. The panel 40 covers substantially all of the surface area of the rear wall 37, i.e., more than half, at least 75%, or at least 95% of the total surface area in different embodiments. The panel 40 is configured as noted below to minimize emanation of sound at a predetermined range of audible sound frequencies by diffusing incident pressure waves and dissipating the absorbed energy as low-grade heat. Optionally, the noise reduction system 50 may additionally include a planar, elongated serrated element 30 arranged flush with a plane of the leading edge 20L and the underside 140, ideally extending along the entirety of the length of the leading edge 20L. In any event, the serrated element 30 when used is co-extensive with as much of length of the leading edge 20L as is available without interfering with proper operation of the landing gear arrangement 16 or 16F.

The general direction of airflow across and around the wings 14 of the aircraft 10 shown in FIG. 2 is indicated by the "FLOW" arrow, with the leading edge 20L of the cavity 20 wetted by ambient airflow before such airflow reaches the trailing edge 20T. The panel 40 may minimize emanation of cavity noise in a predetermined range of audible sound frequencies. The predetermined range of audible sound frequencies may be the low- to mid-frequency range, i.e., about 40 hertz (Hz) to about 2 kHz, with "about" in this particular context meaning to within ±25% of the stated values. In this manner, the disclosed solution alters local flow at the cavity interface, particularly the respective leading and trailing edges 20L and 20T, while adding minimal weight and packaging space.

Figure 2A:
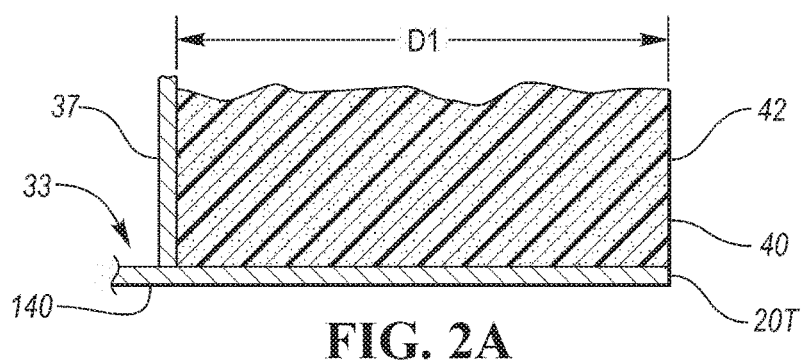
FIG. 2A is a schematic cross-sectional side view illustration of a panel of sound-absorbing material arranged in proximity to a section of fuselage skin of the aircraft shown in FIG. 1.

Referring to FIG. 2A, a skin section 33 of the fuselage 12 of FIG. 1 is shown in partial cross-sectional side view. The exposed surface 42 of the sound-absorbing material 40 within the cavity, which may also be seen in FIG. 2, is wetted by air flowing into the cavity 20. The sound-absorbing material 40 may be secured to a support member 37, such as a rear wall of the cavity 20, via rivets, screws, and/or adhesive material. A thickness (D1) of the sound-absorbing material 40, i.e., a dimension extending toward the support member 37 from the leading edge 20L, should be more than 1 inch (25 mm), with at least 2-3" (50-75 mm) providing optimal sound absorption performance without undue weight and size penalties. Starting from the trailing edge 20T, the sound-absorbing material 40 may cover at least half of the total area of the support member 37, up to covering the entirety of the support member 37. A substantial portion of attainable sound reduction performance in the various applications contemplated herein may be achieved by proper selection and placement of the sound-absorbing materials 40 within the cavity 20. While use of the sound-absorbing material 40 alone may suffice in terms of substantially reducing problematic airframe noise associated with the cavity 20, such benefits may be greatly enhanced using the serrations 30 of FIG. 2.

Referring to FIG. 3, the serrations 30 shown in FIG. 2 are depicted schematically in idealized form as a repeating/periodic chevron or triangle pattern 30A or as a sinusoidal pattern 30B. Slight variations, e.g., 15 percent or less from the ideal presented in FIG. 2, may be present in the pattern 30A or 30B without adversely affecting performance of the serrations 30. In some embodiments, the serrations 30 are substantially flush or coplanar with the leading edge 20L and the underside 140 of FIG. 2, i.e., perfectly flush or slightly recessed by about 1-2 mm with respect to a plane of the underside 140 of FIG. 2.

Additionally, the serrations 30, which are not load bearing, may be constructed of solid and relatively rigid pieces of application-suitable material, e.g., aluminum, composite material, steel, or plastic, with a thickness of about 2-3 mm being suitable for the disclosed function of destabilizing and rendering incoherent a shear layer of airflow passing into and over the cavity 20 before such a shear layer makes contact with the exposed surface 42 of the sound-absorbing material 40 (see FIG. 2). That is, as the boundary layer over the aircraft structure separates at the leading edge 20L of the cavity 20, the serrations 30 promote growth of three-dimensional flow structures within the free shear layer of air. The resultant finer flow structures generated by the serrations 30 effectively reduce the shear layer roll-up process, and thus eliminate span-wise coherence of large-scale flow structures immediately downstream of the leading edge 20L. The finer three-dimensional flow structures decay rapidly due to viscous diffusion, giving rise to a shear layer devoid of coherent flow structures. As a result, the trailing edge 20T of the cavity 20 experiences low amplitude, quasi-random (de-correlated) pressure fluctuations, which may be effectively absorbed by the sound-absorbing material 40.

Still referring to FIG. 3, an aspect ratio of the serrations 30 is defined as:

$$AR = \frac{h}{b},$$

where AR represents the aspect ratio, h represents the height, and b represents the width. According to an embodiment, 0.4<AR<3.5. The height h may be determined by the incoming boundary layer height, δ, on the surface of the aircraft 10 of FIG. 1 at the leading edge 20L. For optimum effectiveness, $$0.3 < \frac{h}{\delta} < 3.$$

The width (b) of the serrations 30, for a tested 18% scale gear model, was on the order of 0.5 inches (12.7 mm), yielding an aspect ratio of about 1. In an example application, the sound-absorbing material 40 may be constructed of an open-cell foam material. Melamine foam may be used, for instance, with such a material found to be effective in the 18% scale model noted below. A heat-resistant meta-aramid material may also be used. For full scale applications, a composition of heat-resistant synthetic fibers such as Nomex® Felt or other similar materials may be used.

Representative sound-attenuating performance of the system 50 of FIG. 2 in a landing gear cavity application was demonstrated in wind tunnel testing, the results of which are depicted in FIGS. 4 and 5. FIG. 4 represents a plot 55 of wind tunnel measurements of the acoustic far field conducted using a phased microphone array with the system 50 of FIG. 2 applied to a main landing gear cavity of an 18% scale, high-fidelity replica of a landing gear very similar to that of the landing gear 16 of FIG. 1, including the cavity 20 and its defined opening. The displayed frequencies in hertz (Hz) represent full-scale aircraft frequencies. Plot 55 displays the reduction in far field sound pressure levels, in decibels (dB), relative to an untreated cavity opening. Positive values represent a reduction or improvement over baseline noise levels, while negative values indicate an increase and thus penalty in noise levels. Thus, the use of the serrations 30 and sound-absorbing foam 40 reduces gear cavity noise relative to existing approach, e.g., by between about 1 dB and 5 dB over a frequency range of 100-500 Hz, and by about 1 dB in the 500-800 Hz range.

FIG. 5 is a plot 60 of power spectral density (PSD) in a flyover direction, with testing results derived using a phased microphone array in a 14×22-foot wind tunnel, and with a 18% scale model having a faired landing gear. Trace 62 represents a baseline aircraft, and trace 64 represents the same aircraft equipped with the serrations 30 and sound-absorbing material 40 of the system 50 shown in FIG. 2. As depicted, the system 50 was able to minimize emanation of cavity nose by reducing such noise, relative to a baseline, by about 2.5 dB over the 100-500 Hz frequency range, and by approximately 1 dB in the 500-1200 Hz range.

The system 50 of FIG. 2, when applied to the exemplary aircraft 10 of FIG. 1, sunroofs, bays, or other cavities having openings exposed to ambient airflow, is thus able to substantially minimize cavity noise with minimal packaging and weight penalties. The disclosed approach includes applying serrations 30 along the leading edge 20L of a cavity interface, i.e., the outer perimeter edges of a vehicle body defining the cavity 20 of FIGS. 1 and 2, and then applying sound-absorbing materials 40 to the rear wall 37 inclusive of the trailing edge 20T, as shown in FIG. 2A. The serrations 30 depicted in FIGS. 2 and 3, and the sound-absorbing materials 40 depicted in FIGS. 2 and 2A, are configured to minimize cavity noise occurring in the low- to mid-frequency range of human-audible sound as shown in FIGS. 4 and 5 by altering local flow at the cavity interface.

The detailed description and the drawings are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A sound reduction system for use in an ambient airflow, the system comprising:

a body defining a cavity having a cavity opening exposed to the ambient airflow, wherein the body forms a cavity interface surrounding the cavity opening, the cavity interface including a cavity floor opposite the cavity opening, a leading edge facing away from the ambient airflow, a trailing edge facing the airflow, and a rear wall extending between the trailing edge and the cavity floor;

a panel of sound-absorbing material attached to and covering substantially all of a total surface area of the rear wall of the cavity interface, the panel being configured to diffuse pressure fluctuations and pressure waves incident on the rear wall of the cavity interface and dissipate absorbed energy as heat to thereby minimize emanation of a predetermined range of audible sound frequencies from the cavity; and an elongated serrated element connected to the body and extending along the leading edge, wherein a plane of the elongated serrated element is arranged flush with a plane of the leading edge, wherein individual serrations of the elongated serrated element have a height (h), a width (b), and an aspect ratio (AR) of between 0.4 and 3.5, and wherein:

$$AR = \frac{h}{b}.$$

2. The system of claim 1, wherein the predetermined range of audible sound frequencies is about 40 hertz (Hz) to 2 kHz.

3. The system of claim 1, wherein the elongated serrated element has a repeating triangle or chevron pattern.

4. The system of claim 1, wherein the elongated serrated element has a sinusoidal pattern.

5. The system of claim 1, wherein $$0.3 < \frac{h}{\delta} < 3,$$

wherein
δ is an incoming boundary layer height relative to a surface of the body at the leading edge.

6. The system of claim 1, wherein the panel is constructed of an open-cell foam material.

7. The system of claim 6, wherein the open-cell foam material is melamine foam.

8. The system of claim 6, wherein the panel is constructed of a heat-resistant meta-aramid material.

9. The system of claim 1, wherein the body is an aircraft fuselage or an aircraft wing and the cavity is a landing gear cavity configured to house a landing gear arrangement.

10. An aircraft comprising:
a fuselage having a centerline;
first and second wings connected to the fuselage and extending radially outward from the centerline, wherein the fuselage, the first wing, and/or the second wing defines an undercarriage cavity having a cavity opening exposed to ambient airflow when the aircraft is in motion, and wherein a cavity interface defined by the fuselage, the first wing, and/or the second wing surrounds the cavity opening, the cavity interface including:
a cavity floor opposite the cavity opening;
a leading edge facing away from the ambient airflow;
a trailing edge facing the airflow; and
a rear wall extending between the trailing edge and the cavity floor;
a panel of sound-absorbing material attached to the rear wall of the undercarriage cavity, the panel being configured to minimize emanation of a predetermined range of audible sound frequencies from the undercarriage cavity; and
an elongated serrated element connected to the body and extending along the leading edge, wherein a plane of the elongated serrated element is generally flush with a plane of the leading edge, wherein individual serrations of the elongated serrated element have a height (h), a width (b), and an aspect ratio (AR) of between 0.4 and 3.5, and wherein:

$$AR = \frac{h}{b}.$$

11. The aircraft of claim 10, wherein the predetermined range of audible sound frequencies is about 40 hertz (Hz) to 2 kHz.

12. The aircraft of claim 10, wherein the elongated serrated element has a repeating triangle or chevron pattern.

13. The aircraft of claim 10, wherein the elongated serrated element has a sinusoidal pattern.

14. The aircraft of claim 10, wherein $$0.3 < \frac{h}{\delta} < 3,$$

wherein δ is an incoming boundary layer height on a surface of the body at the leading edge.

15. The aircraft of claim 10, wherein the panel is constructed of an open-cell foam material.

16. The aircraft of claim 10, wherein the panel is constructed of a heat-resistant meta-aramid material.

17. A sound reduction system for an aircraft in an ambient airflow, the aircraft including a body, a wing, and a cavity defined in the body and/or wing, the cavity having a cavity opening exposed to the ambient airflow, the body forming a cavity interface surrounding the cavity opening, the cavity interface including a cavity floor opposite the cavity opening, a leading edge facing away from the ambient airflow, a trailing edge facing the airflow, and a rear wall extending between the trailing edge and the cavity floor, the sound reduction system comprising:
a panel of sound-absorbing material configured to attach to and cover at least a portion of the rear wall of the cavity interface, the panel being configured to minimize emanation of a predetermined range of audible sound frequencies from the cavity; and
an elongated serrated element configured to attach to the cavity interface and extend along the leading edge, wherein a plane of the elongated serrated element is generally flush with a plane of the leading edge, wherein individual serrations of the elongated serrated element have a height (h), a width (b), and an aspect ratio (AR) of between 0.4 and 3.5, and wherein:

$$AR = \frac{h}{b}.$$

18. The system of claim 17, wherein the predetermined range of audible sound frequencies is about 40 hertz (Hz) to about 2 kHz.

19. The system of claim 17, wherein the elongated serrated element has a repeating triangle pattern, a chevron pattern, or a sinusoidal pattern.

20. The system of claim 17, wherein $$0.3 < \frac{h}{\delta} < 3,$$

and wherein δ is an incoming boundary layer height relative to a surface of the body at the leading edge.

* * * * *